United States Patent
Reuter et al.

(10) Patent No.: US 6,799,618 B2
(45) Date of Patent: Oct. 5, 2004

(54) PNEUMATIC TIRE HAVING AN OVERLAY REINFORCEMENT

(75) Inventors: René François Reuter, Burden (LU); Frank Schmitz, Bissen (LU); Serge Julien Auguste Imhoff, Schrondweiler (LU); Yves Donckels, Natoye (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 128 days.

(21) Appl. No.: 10/323,326

(22) Filed: Dec. 18, 2002

(65) Prior Publication Data

US 2004/0118499 A1 Jun. 24, 2004

(51) Int. Cl.[7] .............................. B60C 9/00; B60C 9/20; B60C 9/22; D02G 3/48
(52) U.S. Cl. ........................... 152/527; 57/238; 57/902; 152/526; 152/531; 152/533
(58) Field of Search ................................ 152/526, 527, 152/531, 533; 57/238, 902

(56) References Cited

U.S. PATENT DOCUMENTS

| | | | |
|---|---|---|---|
| 4,155,394 A | | 5/1979 | Shepherd et al. |
| 4,893,665 A | | 1/1990 | Reuter et al. |
| 5,558,144 A | * | 9/1996 | Nakayasu et al. .......... 152/527 |
| 6,058,996 A | * | 5/2000 | Suzuki .................... 152/533 X |
| 6,425,426 B1 | | 7/2002 | Osborne et al. |
| 6,533,012 B1 | * | 3/2003 | Jardine et al. .......... 152/531 X |
| 6,615,887 B2 | * | 9/2003 | Denoueix et al. ....... 152/531 X |

FOREIGN PATENT DOCUMENTS

| | | |
|---|---|---|
| EP | 412928 A2 | 2/1991 |
| EP | 0661179 | 7/1995 |
| JP | 09156312 A  * | 6/1997 |
| WO | 9706297 | 2/1997 |
| WO | 03/060212 A1 | 7/2003 |

* cited by examiner

Primary Examiner—Adrienne C. Johnstone
(74) Attorney, Agent, or Firm—Nancy T. Krawczyk

(57) ABSTRACT

A pneumatic tire (10) comprises a radial ply (12) carcass, a tread portion disposed radially outwardly of the crown area (14) of the carcass and a crown reinforcing structure interposed between the tread portion (19) and the carcass. The crown reinforcing structure includes a belt assembly (15) having at least a first (16), radially innermost and a second (17), radially outermost belt ply as well as a textile overlay structure (18) which is superimposed radially outwardly to said belt assembly (15). The textile overlay structure is reinforced with cords (40, 51) being made of materials including nylon and aramid. At initial elongation of the cords, the primary load bearing yarns are the nylon yarns; after appreciable elongation the primary load bearing yarns are the aramid yarns.

10 Claims, 4 Drawing Sheets

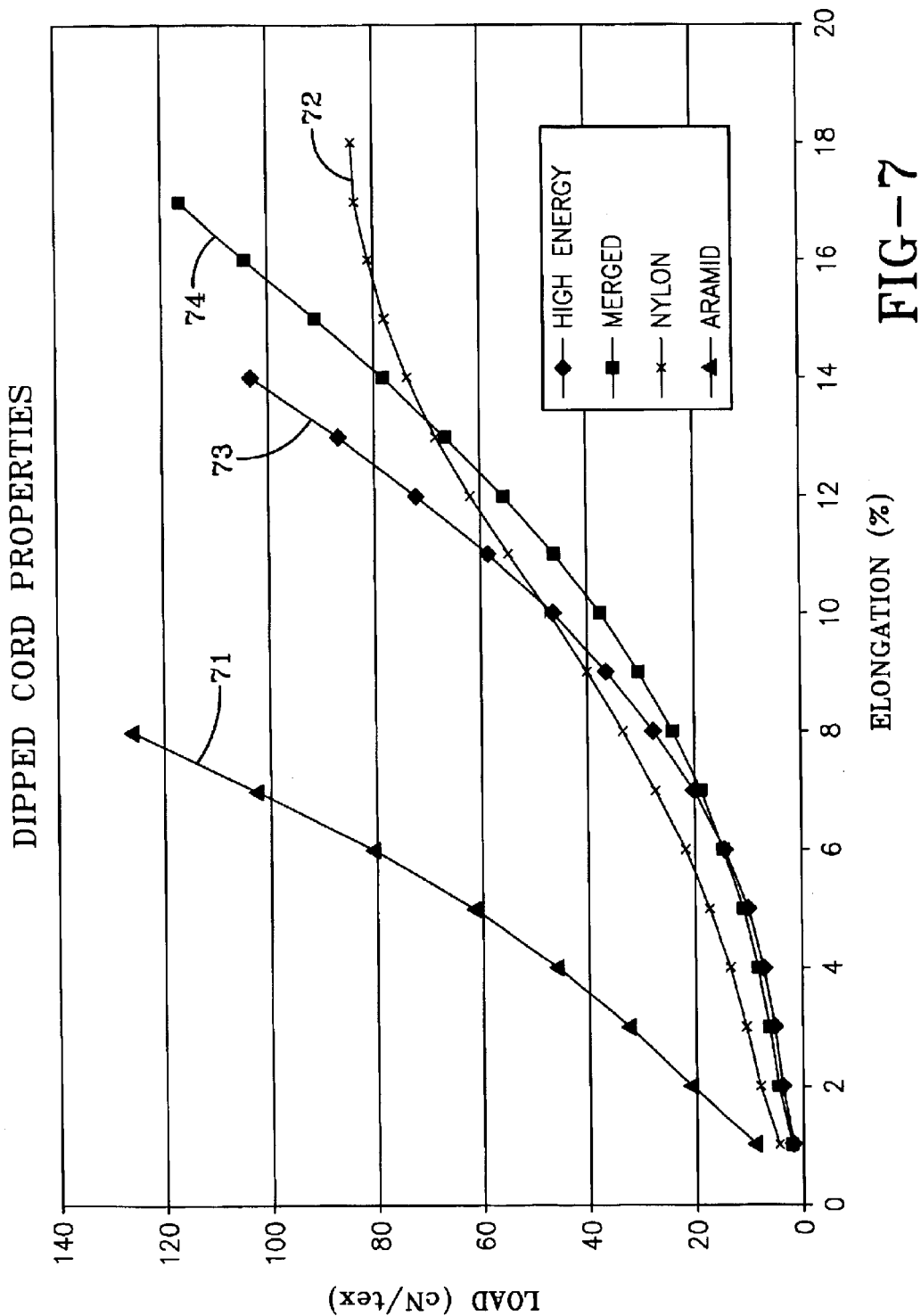

PNEUMATIC TIRE HAVING AN OVERLAY REINFORCEMENT

FIELD OF THE INVENTION

The present invention relates generally to pneumatic tires and more specifically to radial carcass tires having a textile overlay structure located radially outwardly of their belt assembly.

BACKGROUND OF THE INVENTION

Radial carcass tires having a reinforcing member disposed radially outwardly of the belt assembly comprising textile cords oriented at small angles with respect to the midcircumferential plane of the tire have been found to be particularly durable when subjected to high revolution speeds.

Such a reinforcing member, referred to as an overlay ply, can be interposed between the radially outermost ply of the belt assembly and the tread and comprise one or more wraps having a width which is about equal to that of the widest of the belt plies.

Alternatively, the overlay ply can consist of two separate axially spaced apart ply portions either disposed radially outwardly of the belt assembly such as to cover the edges of the radially outermost belt ply or interposed between the belt plies such as to extend between the edges thereof.

Another possibility of assembling an overlay ply consists in interposing a helically wound cord or single yarn, which has been coated with elastomeric material, between the radially outermost ply of the belt assembly and the tread. As winding a single cord is time consuming, it has been proposed to assemble the overlay ply from a 5 to 30 mm wide, helically wound strip, made from cord reinforced elastomeric material, located radially outwardly to the belt plies.

The usual reinforcing material for the overlay plies is nylon, which has a Youngs modulus of about 6,000 MPa. Such a low modulus is necessary to accommodate the expansion of the belt during the shaping and vulcanizing steps.

European patent application 412,928 discloses a textile overlay structure reinforced with cords being made of materials showing on a homogeneous specimen a modulus of at least 15,000 MPa. The cords have a twist multiplier between 6 and 14 and at least one of the yarns included in the cords has a twist of at least 14 turns per inch, in abbreviation TPI (550 turns per meter, in abbreviation TPM). The use of high modulus cords in the overlay ply leads to tires including less material for a given reinforcing strength, hence the flatspot contribution from the overlay ply is reduced. Additionally, lighter, cooler running tires are obtained, which have increased high speed performance.

U.S. Pat. No. 4,893,665 discloses a cord comprising (a) at least two yarns each of which consists only of aramid filaments; and (b) a single core yarn which is not twisted together with or around any other yarn and consists of at least one filament selected from the group consisting of polyamides having a structure which is at least partially oriented and polyesters having a structure which is at least partially oriented such that a force of about 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, said cable having a twist multiplier in the range of 5 to 12, and the ratio of twist in the aramid yarns to the twist in the cable being in the range of 1.0 to 2.0.

Referring to FIGS. 3 and 4 there is illustrated an example of a cord 40 manufactured in accordance with the '665 patent. In the example shown the cord comprises three yarns 41,42,43 each of which consists only of aramid filaments. It is understood though that a cord according to the invention only needs to have at least two yarns consisting only of aramid filaments. As used herein "consists of" or "consists only of" means that no filaments of any material other than that specified are present in a yarn. A single core yarn 44 is disposed such that each of the aramid yarns 41,42,43 is adjacent to at least one other aramid yarn and is twisted about the core yarn, but the aramid yarns are not twisted about one another. That is to say, the aramid yarns completely surround the core yarn. The core yarn consists of at least one filament selected from the group consisting of polyamides such as nylon. As used herein a "core yarn" is understood to be a yarn that is not twisted together with, or twisted around any other yarn, although the filaments of a core yarn may be twisted together with one another. In a preferred embodiment the core yarn consists of at least one filament of at least partially oriented nylon, and in a most preferred embodiment the core yarn consists of at least two, (usually more than one hundred), filaments of a nylon which has a structure that is at least partially oriented, said nylon filaments being twisted together with one another.

U.S. Pat. No. 4,155,394 discloses a textile cord comprised of a plurality of dissimilar plies of individual yarns helically cabled together, having one to six plies of aramid yarn, having a modulus, at one percent elongation and at a twist of about one turn per inch, in the range of 250 to 600 grams per denier and one to twelve plies individually selected from polyester and/or nylon yarns having a modulus, at one percent elongation and at a twist of about one turn per inch, in the range of 20 to 100 grams per denier. The yarns are cabled by twisting together helically about one another to form a cord having a twist of cabled yarns, or plies, in the range of two to 16 turns per inch, where the aramid yarn has a residual twist in its ply in the range of one to six turns per inch opposite the cord twist and said polyester or nylon yarn has a residual twist in its ply in the range of 0 to 0.5 turns per inch opposite the cord twist, so that (A) at an initial cord elongation, under an initial longitudinal tensile stress, the primary load bearing ply is the polyester or nylon, as such yarn stretches while said aramid yarn extends without appreciable stretch, and (B) after additional elongation of the cord, under appreciable additional longitudinal tensile stress, the primary load bearing yarn is the aramid as it reaches substantially full extension.

Referring to FIG. 5A, there is shown an unstretched cord 51 of helically cabled dissimilar yarns having a twist of about eight turns per inch comprised of one yarn of aramid 52 having a residual twist of about six turns per inch and two plies or yarns of nylon 53 having a residual twist of 0.5 turns per inch. In FIG. 5B, as the cord 51 is initially stretched, the load is primarily taken by the polyester or nylon cord 53 as they elongate by stretching in an axial fashion whereas the essentially inextensible aramid yarn 52, instead of stretching, simply elongates by beginning to straighten out. In FIG. 5C, as the 51 is stretched further in the longitudinal direction, the polyester or nylon yarn 53 continues to elongate by stretching, until the aramid yarn 52 essentially reaches the limit of is elongation by straightening and then becomes the principal load-bearing member of the cord.

It is an object of the present invention to provide a pneumatic tire with an overlay structure, which has excellent high speed properties, good comfort and rolling resistance, reduced flatspotting and produces low noise.

SUMMARY OF THE INVENTION

The invention provides a tire as defined in the claims. More specifically the invention provides a pneumatic tire comprising a radial ply carcass, a tread disposed radially outwardly of the crown region of the carcass and a crown reinforcing structure interposed between the tread portion and the crown region of the carcass in circumferential surrounding relation to the carcass, whereby the crown reinforcing structure includes a belt assembly having at least a first, radially innermost and a second, radially outermost belt ply, each of the belt plies comprising reinforcement cords extending parallel to one another in each belt ply, and the cords in the first belt ply making with the cords in the second belt ply opposed angles with respect to the equatorial plane of the tire, as well as a textile overlay structure consisting of a cord reinforced helically wound elastomeric strip extending transversely over the belt assembly and making an angle of between 0 degrees and 5 degrees with the equatorial plane of the tire. The cords include yarns of aramid and nylon twisted together and have, on the graph representing their elongation versus the load applied, a tangent of at most 5 cN/tex. % at elongations up to 4% and an inclination above 10 cN/tex. % at elongations above 6% after shaping and curing of the tire. The tire is preferably a passenger tire, runflat or not.

BRIEF DESCRIPTION OF THE DRAWINGS

To acquaint persons skilled in the art most closely related to the instant invention, certain preferred embodiments thereof are now described with reference to the annexed drawings. These embodiments are directed towards the use of hybrid cords, as herebelow defined; they are illustrative and can be modified in numerous ways within the spirit and scope of the invention defined in the claims herebelow.

FIG. 7 shows a stress-strain curve of dipped cords; and

DETAILED DESCRIPTION OF THE INVENTION

Figure 1:
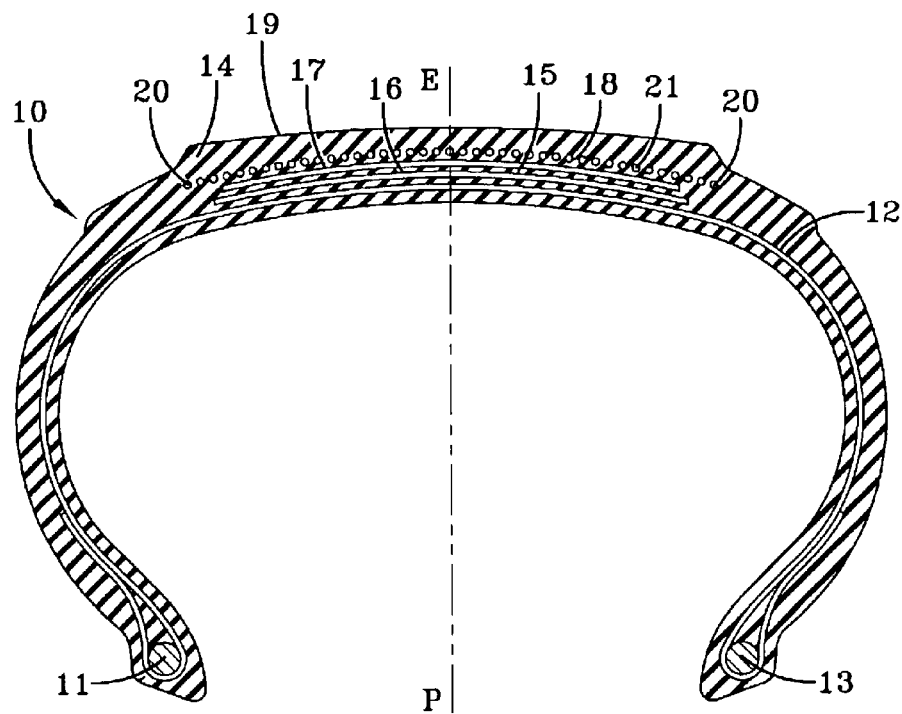
FIG. 1 is a cross-sectional view of a pneumatic tire made in accordance with the present invention.
Figure 2:
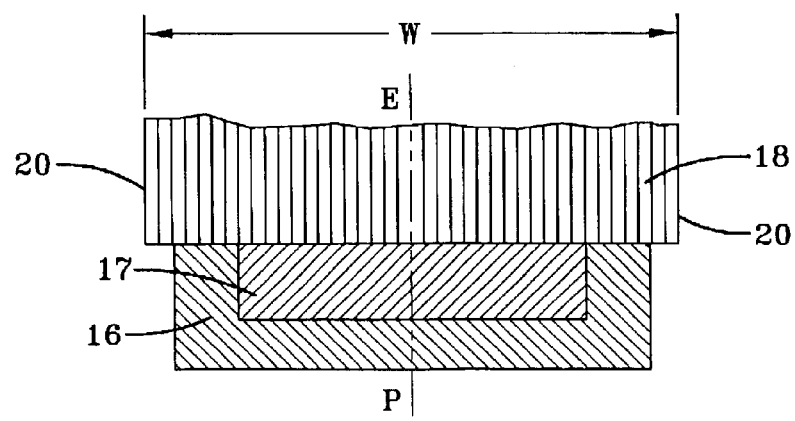
FIG. 2 is a detail showing the breaker belt assembly and the overlay ply of FIG. 1.

With reference to FIGS. 1 and 2, there is represented a radial carcass pneumatic tire 10 having a pair of substantially inextensible bead cores 11, 13 which are axially spaced apart with a radial carcass ply 12 extending between the bead cores. The carcass ply is folded axially and radially outwardly about each of the bead cores and is reinforced by cords which are substantially parallel to each other and make an angle with the equatorial plane (EP) of the tire.

As used herein, the "equatorial plane" of the tire is a plane that is perpendicular to the axis of rotation of the tire and passes through the center of the tire tread, the terms "axial" and "axially" refer to directions which are parallel to the axis of rotation of the tire and the terms "radial" and "radially" refer to directions that are radially toward or away from the axis of rotation of the tire.

The cords of the carcass ply 12 can be made of any suitable material, for example rayon, polyester, polyamide or aromatic polyamide. The crown area 14 of the tire 10 is reinforced by a belt assembly 15 located radially inwardly of the tire tread 19. The belt assembly is essentially rigid and comprises two concentric belt plies 16 and 17, each of which consists of an elastomeric layer reinforced by steel cords or other suitable materials, as for example aromatic polyamide, glassfiber, PVA, carbon-fiber or rayon cords. Within each ply, the cords are substantially parallel to each other. The cords of the radially innermost belt ply 16 make an angle of between 15 degrees to 30 degrees with the equatorial plane (EP) of the tire, whereas the cords of the radially outermost belt ply 17 extend in the diagonally opposite direction to the cords of the radially innermost belt ply i.e. they make an angle of between −15 degrees to −30 degrees with the equatorial plane (EP) of the tire; preferred angles are respectively 21 degrees to 25 degrees and −21 degrees to −25 degrees.

A helically wound strip, forming overlay 18, is superimposed radially externally to the outermost belt ply 17 and extends transversely over the widest of the belt plies. The helically wound strip is made from elastomeric material reinforced by hybrid cords including aramid and nylon. As used herein, "aramid" and "aromatic polyamide" are both understood to mean a manufactured fiber in which the fiber-forming substance is generally recognized as a long chain synthetic aromatic polyamide in which at least 85% of the amide linkages are attached directly to the two aromatic rings. Representative of an aramid or aromatic polyamide is a poly (p-phenyleneterephtalamide). Nylon is understood to be an aliphatic polyamide 6.6, 6 or 4.6.

Figure 3:
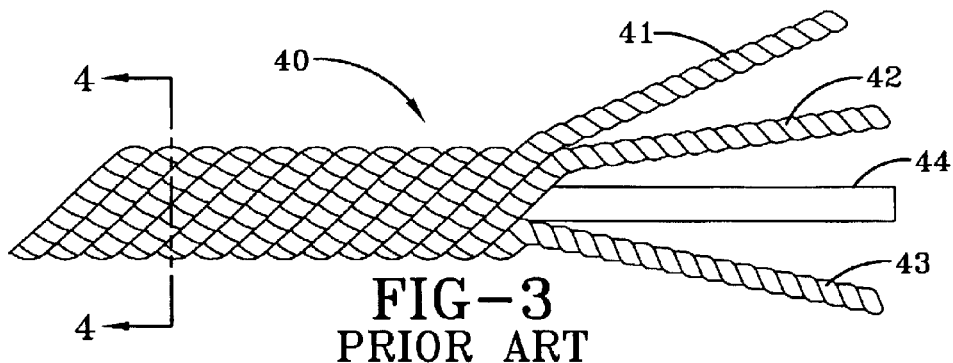
FIGS. 3 and 4 are side respectively cross-sectional views of a first embodiment of the cords used in the present invention and as disclosed in U.S. Pat. No. 4,893,665.
Figure 4:
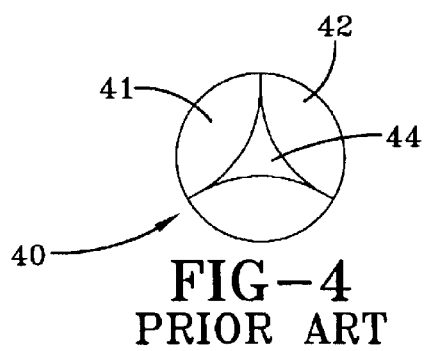
Figure 6:
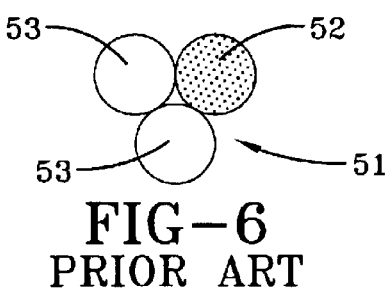
FIGS. 5 and 6 are side respectively cross-sectional views of a second embodiment of the cords used in the present invention and as disclosed in U.S. Pat. No. 4,155,394.
Figure 5A:
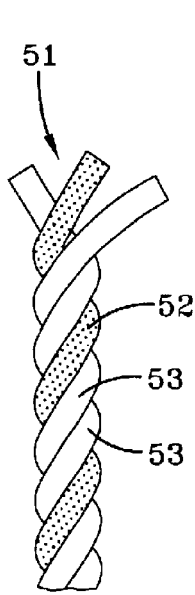
Figure 5B:
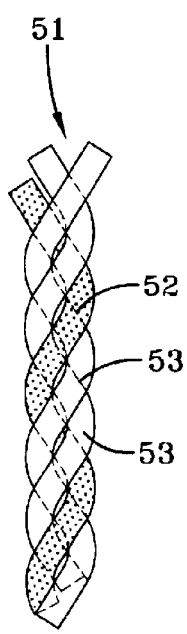
Figure 5C:
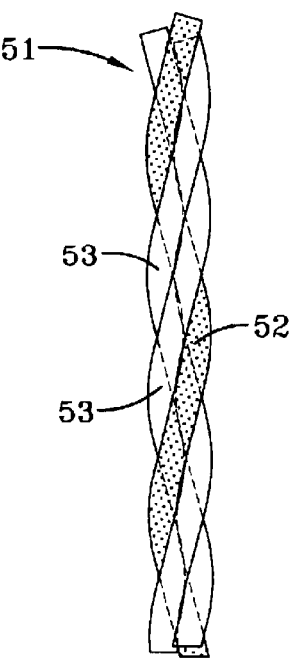

The helical convolutions of the strip make an angle of between 0–5 degrees with the equatorial plane (EP) and are in abutment with any adjacent convolution. The strip has preferably a thickness in the range of between 0.6 and 1.4 mm and a width in the range of between 5 and 30 mm and a cord distribution density of at least 15 ends per inch, in abbreviation EPI (590 ends per meter, in abbreviation EPM) and preferably in the range of 20 to 50 EPI (800 to 2,000 EPM). The cord constructions are either what we call hereafter "high energy cords", as described and claimed in U.S. Pat. No. 4,893,665 and represented in FIG. 3 and FIG. 4 or what we call hereafter "merged cords" as described and claimed in above mentioned U.S. Pat. No. 4,155,394 and represented in FIGS. 5A, 5B, 5C and in FIG. 6.

In a cord, each of the yarns has its component filaments twisted together a given number of turns per unit of length of the yarn (usually expressed in TPI) and additionally the yarns are twisted together a given number of turns per unit of length of the cord. The direction of twist refers to the direction of slope of the spirals of a yarn or cord when it is held vertically. If the slope of the spirals conform in direction to the slope of the letter "S", then the twist is called "S" or "left hand". If the slope of the spirals conform in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

High energy cords presently preferred have the following construction: 1100/2+940/1 dtex, twisted 14Z/3S/9S TPI (meaning that two yarns of 1100 dtex Aramid are each twisted 14 TPI in the Z direction, one yarn of nylon is twisted 3 TPI in the S direction and the three yarns receive a cord twist of 9 TPI in the S direction); 1100/3+940/1 dtex, twisted 14Z/3S/9S TPI; 1100/3+470/1 dtex, twisted 14Z/3S/9S; 1100/2+940/1 dtex, twisted 12Z/3S/7S; 1100/2+470/1 dtex, twisted 12Z/3S/7S; 1100/3+940/1 dtex, twisted 12Z/3S/7S; 1100/2+940/1 dtex, twisted 10Z/3S/5S; 1100/2+470/1 dtex, twisted 10Z/3S/5S. Most preferred among these constructions are 1100/3+940/1 dtex, twisted 14Z/3S/9S and 1100/2+940/1 dtex, twisted 12Z/3S/7S.

Merged cords presently preferred have the following construction: 1100/2+940/1 dtex, twisted 14Z/9Z/9S (meaning that two yarns of 1100 dtex Aramid are each twisted 14 TPI in the Z direction, one yarn of nylon is twisted 9 TP1 in the Z direction and the three yarns receive a cord twist of 9 TPI in the S direction); 1100/3+940/1 dtex, twisted 14Z/9Z/9S; 1100/2+940/1 dtex, twisted 14Z/9Z/9S; 1100/2+940/1 dtex, twisted 9Z/9Z/9S; 1100/2+940/1 dtex, twisted 9Z/6Z/9S; 1100/2+940/1 dtex, twisted 12Z/7Z/7S; 1100/3+940/1 dtex, twisted 12Z/7Z/7S; 1100/2+940/1 dtex, twisted 11Z/8Z/11S. Most preferred among these constructions is 1100/2+940/1 dtex, twisted 14Z/9Z/9S and 1100/2+940/1 dtex, twisted 11Z/8Z/11S.

In a prior art tire having a nylon reinforced helically wound layer, superimposed radially externally on the outermost belt ply, the width of the belt ply ranges between 98 and 107% of the treadwidth; the treadwidth is defined as the greatest axial distance across the tread, when measured from a footprint of the tire, when the tire is subjected to its design load and when inflated to its design pressure for said load. A large belt ply is usually required to counter centrifugal forces at the shoulder of the tire when traveling at high speed. However, the stresses existing at the belt edges can result in deformation and separation of the belt edges from the surrounding rubber. A small belt ply constitutes a building advantage, but leads to shoulder wear caused by insufficient rigidity of the tread at its edges.

The helically wound overlay structure overlaps preferably the lateral ends of the radially outermost belt ply by a few mm and provides an excellent rigidity in the circumferential direction as well as a uniform pressure distribution on the tread surface. The helically wound overlay structure according to the invention allows a reduction of the belt ply width of about 5%, i.e. the width of the belt plies ranges between 93% and 102% while maintaining the tire's high speed performance at a level at least equal to that of a prior art tire.

Although the overlay structure shown in FIG. 1 has only one layer, it could equally comprise a second layer located adjacent to and radially outside of the first layer. Preferably, the second layer should have its helical convolutions wound with the opposite hand to the first layer so that the cords of each layer cross at a very small angle. With such a construction the two layers can be wound continuously in succession without a break in the strip. It is to be understood that the helical convolutions of the helically wound strip, in place of being in abutment with any adjacent convolution, can also have an overlapping relationship with the previous convolutions, which overlap can be constant or variable across the width of the belt reinforcing structure without departing from the spirit of the instant invention.

It is well known in the tire art that the helical convolutions of a tire built on a flat cylindrical drum are subjected to different elongations during the shaping and vulcanizing step of the tire manufacturing process because the expansion of the tire is greater in the center portion than in the shoulder portions of the belt reinforcing structure. In order to minimize the resulting differences in the stresses of the strip, it is preferable to wind the strip in the belt center with a very small winding tension as compared to the winding tension used when making the tire shoulder portion.

Alternatively, the surface of the cylindrical drum upon which the strip is helically wound can be given a slightly convex shape. This convex shape should conform as closely as possible to the sectional radial shape the overlay ply takes in the finished tire, so as to obtain a minimal stretch difference between the center and shoulder portions of the overlay strip during shaping and curing.

As well known in the tire art, an uncured radial tire undergoes an expansion of about two percent during the shaping in the tire mold. This shaping effects a pantographing of the cords reinforcing the belt plies, and a pretension to the cords reinforcing the carcass ply(ies) as far as these cords cannot slide around the bead cores. The cords reinforcing the helically wound overlay are also pretensioned during the shaping operation and by choosing adequately the uncured tire dimension and the mold shape, or put in other words, the clearance of the uncured tire in the mold, the desired pretension of the merged respectively high energy cords can be obtained. It is understood that the curing temperature of 160 to 200° C. effects a slight shrinking of the nylon cords only which effect comes in addition to the shaping.

FIG. 7 shows stress-strain curves of different cords after being dipped (and subsequently dried) in an RFL bath. Such dipping is well known to the man skilled in the art and has as main object to improve adherence of the cords to the rubbery material. The abscissa show the elongation in percent of the cords whereon loads are applied as more specifically represented on the ordinates in centi.Newton per tex. Represented is the behavior of aramid cords—reference 71—, nylon cords—reference 72—, high energy cords—reference 73— and merged cords—reference 74—. It can be seen that for low loads, up to about 30 cN/tex, the stress strain behavior of the merged 74 and the high-energy cords 73 can be compared to the behavior of the nylon cords 72. Put in other words, at low applied forces, the expansion potential of the merged and high energy cords is substantial. This feature allows an easy shaping of the green tire on the tire building drum and subsequently in the mold. It is to be noted that aramid cords have (also) a high elongation resistance at low elongations; this could become problematic during the manufacturing of the tire. The manufacturing and dipping steps of the cords and the subsequent tire building must be tightly controlled in order to avoid losing too much of the elongation potential of the aramid cords. The aramid cords used in the graphs and for comparison in the example below are as described in European patent application 412 928.

Figure 8:
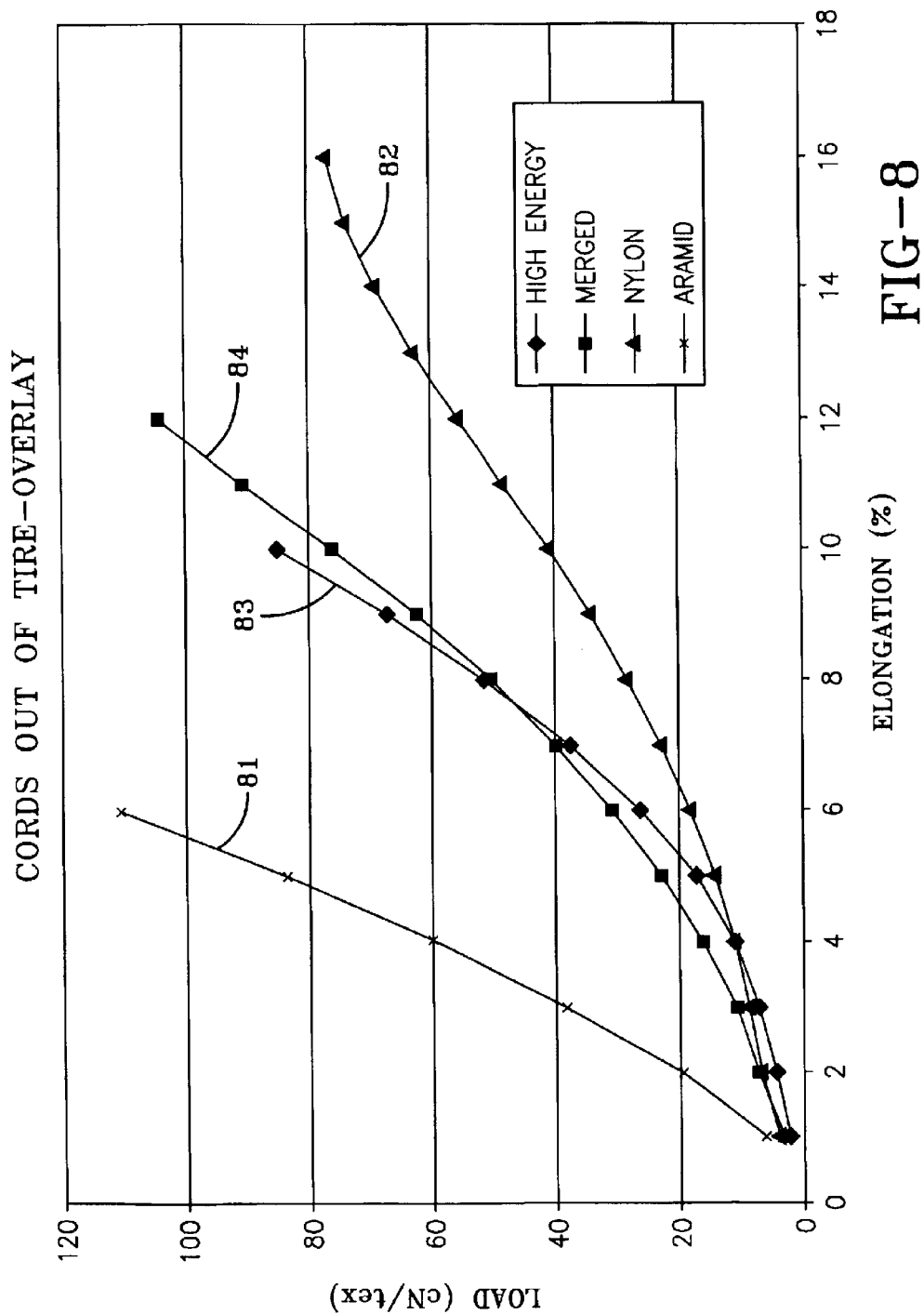
FIG. 8 shows a stress-strain curve of cords removed from a cured tire.

FIG. 8 shows stress-strain curves of different cords after shaping and curing the tires. The cords have been taken out of the tire whereby care has been taken to submit them to a minimum of deformation. As on FIG. 7 the abscissa show the elongation in percent of the cords whereon loads are applied which are represented on the ordinates in centi.Newton per tex. Represented are, as in FIG. 7, the behavior of aramid cords—reference 81—, nylon cords—reference 82—, high energy cords—reference 83— and merged cords—reference 84—. It appears that the stress-strain curves of the cords taken out of a tire are similar to those of the corresponding dipped cords with the main difference that there is a shift towards the strain behavior of the cord at higher elongation. This is as expected, as some of the elongation potential of the dipped cords was lost in the shaping of the tire on the building drum and in the mold. Further differences stem mainly from a change of diameter of the cords and the high temperature of about 200 degrees the nylon filaments were subjected to.

It can be seen that for low loads, up to about 20 cN/tex, the stress strain behavior of the merged 84 and the high-energy cords 83, can be compared to the behavior of the nylon cords 82. This feature confers good comfort and low noise to the tire at low speeds. At high loads, meaning loads above 40 cN/tex, up to the breaking points of the cords, the behavior of the merged and high energy cords can be compared to the behavior of aramid cords. Such are known for conferring excellent high speed properties to the tires. Drawback of nylon cords at high loads is that their elongation resistance is only average, so that the tire fails at relatively low speed. Drawback of aramid cords is that apart from the reduced comfort and high noise they confer only average rolling resistance to a tire.

It appears from the above, that a cord including the respective advantages and avoiding the drawbacks of the nylon and aramid cords, should have an inclination or tangent on the graph representing the elongation versus the load applied of at most 5.5 cN/tex: % at elongations up to 4% and preferably of at most 4.5 cN/tex: %; most preferred are values of 4.0 cN/tex: %. Minimum tangent values are 2.5 because a restrictive effect of the cords is required during the manufacturing of the tire as well as at low speeds.

At elongations above 6% and preferably above 8%, the graph representing the elongation versus the load applied should have an inclination above 10 cN/tex: % and preferably above 17 cN/tex: %; most preferred are values of at least 18 cN/tex: %. Maximum tangent values should be comparable to those of the aramid cords. A tangent having a value superior to 28 cN/Tex: % is anyhow not desirable because such extreme stiffness, though of benefit for high speed, generates noise and eliminates comfort.

The benefits of the present invention become apparent from a comparison test which has been made between low aspect ratio high performance radial tires including a conventional helically wound overlay, reinforced with 1400/2 dtex twisted 6/6 TPI nylon cords or 1100/2 dtex twisted 16/16 TPI aramid cords at a lateral density of 30 EPI (1180 EPM or ends per meter) and tires including a helically wound overlay, reinforced with high energy cords 1100/2+ 940/1 dtex twisted 12Z/3S/7S TPI at a density of 28 EPI (110 EPM). Within each tire series the gauges of the strip, the spiral layout as well as the other constructional details of the tire, have been kept the same within the usual manufacturing tolerances. Tires having the sizes as indicated in the table gave the following results:

| | High speed performance | | |
|---|---|---|---|
| | 245/45R18 | 225/50R16 | 225/50R17 (2 tires) |
| Nylon | 9 min. at 280 | 4 min. at 270 | — — |
| Aramid | 1 min. at 290 | 7 min. at 290 | 8 min. at 280  3 min. at 290 |
| Hybrid cord | 1 min. at 300 | 1 min. at 290 | 6 min. at 280  1 min. at 290 |

The high speed performance data have been derived from conventional high speed endurance tests. The conventional high speed endurance tests consist of subjecting the tire to revolution speeds that gradually increase by steps of 10 km/h. The tire which is inflated to its design pressure is pressed against a drum with a force equivalent to its design load and the tire is then revolved with the drum for ten minutes at each of a series of increasing speed steps. The tire's high speed endurance is measured by the highest speed step that it can sustain during a given interval without being destroyed. In the above table 1 min. at 290 means that the tire successfully rotated for 10 minutes at 280 km/h and after increasing the speed to 290 km/h the tire failed after 1 minute at that speed.

The above results clearly demonstrate the excellent high speed performance of tires manufactured according to the teaching of the invention. It is to be noted that for the 50 series aspect ratio tires, the high twist aramid cord reinforcement had better high speed results. Aramid cords are well known for their strength; main trade-off is their higher noise and slightly inferior handling as compared to the hybrid cords.

The invention has been more specifically described with respect to a crown reinforcing structure, whereby the cord reinforced helically wound elastomeric strip extends transversely over the belt assembly which has at least a first, radially innermost and a second, radially outermost belt ply. It can be envisioned that the elastomeric strip is wound directly on the sole carcass ply or on the radially outermost carcass ply, in the crown region of the tire, so that the helically wound convolutions making an angle comprised between zero and five degrees with respect to the equatorial plane, extend underneath in place of above the belt plies. Such underlay is of interest in tires allowing runflat operation, meaning tires allowing to be driven while deflated. As more specifically described in European patent application 1 127 718 it is of advantage in runflat tires that such underlays have a small modulus in normal inflated mode and a high modulus in runflat mode. The underlay may comprise one continuous strip helically-wound to form the entire underlay, it may comprise multiple radially-overlapping or alternatively laterally spaced layers, formed from either one long length of ply material or separate lengths of ply material. The underlay width may be larger or narrower or of equal width to the breaker package. Also such tires have usually no overlay reinforcement, it may be of advantage for specific high speed applications to provide such.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A pneumatic tire comprising a radial ply carcass, a tread disposed radially outwardly of the crown region of the carcass and a crown reinforcing structure interposed between the tread portion and the crown region of the carcass in circumferential surrounding relation to the carcass, whereby the crown reinforcing structure includes a belt assembly having at least a first, radially innermost and a second, radially outermost belt ply, each of the belt plies comprising reinforcement cords extending parallel to one another in each belt ply, and the cords in the first belt ply making with the cords in the second belt ply opposed angles with respect to the equatorial plane of the tire, as well as a textile overlay structure consisting of a cord reinforced helically wound elastomeric strip extending transversely over the belt assembly, the elastomeric strip and each overlay cord therein making an angle of between 0 degrees and 5 degrees with the equatorial plane of the tire, the tire characterized in that:

the elastomeric strip includes at least one hybrid cord of yarns of aramid and nylon twisted together; and each twisted cord has, on the graph representing its elongation versus the load applied, a tangent of at most 5 cN/tex % at elongations up to 4% and an inclination above 10 cN/tex % at elongations above 6% after shaping and curing of the tire.

2. A pneumatic tire according to claim 1, characterized in that the twisted cords have a tangent on the graph representing the elongation versus the load applied, of at most 4.0 cN/tex.% at elongations up to 4%; and an inclination above 17.0 cN/tex.% at elongations above 6%.

3. A pneumatic tire according to claim 1, characterized in that the overlay structure has two layers wherefrom the second layer is located adjacent to and radially outside of the first layer.

4. A pneumatic tire according to claim 1, characterized in that said strip has a width in the range of between 5 and 30 mm and in that the cords reinforcing the strips have a fabric density of at least 15 EPI.

5. A pneumatic tire according to any of claims 1 to 4, characterized in that each twisted cord of the overlay structure consist of high energy cord having the construction 1100/2+470/1, twisted 12Z/3S/7S TP1.

6. A pneumatic tire according to any of claims 1 to 4, characterized in that each twisted cord of the overlay structure consists of high energy cord having the construction 1100/2+940/1, twisted 10Z/3S/5S TP1.

7. A pneumatic tire according to claim 1, characterized in that each twisted cord of the overlay structure consists of a high energy cord having the construction 1100/3+940/1 dtex, twisted 14Z/3S/9S TPI.

8. A pneumatic tire according to claim 1, characterized in that each twisted cord of the overlay structure consists of high energy cord having the construction 1100/2+940/1 dtex, twisted 12Z/3S/7S TPI.

9. A pneumatic tire according to claim 1, characterized in that each twisted cord of the overlay structure consists of merged cord having the construction 1100/2+940/1 dtex, twisted 14Z/9Z/9S TPI.

10. A pneumatic tire according to claim 1, characterized in that each twisted cord of the overlay structure consists of merged cord having the construction 1100/2+940/1 dtex, twisted 11Z/8Z/11S TPI.

* * * * *